(12) United States Patent
Miao et al.

(10) Patent No.: US 8,934,519 B2
(45) Date of Patent: Jan. 13, 2015

(54) RAKE OR G-RAKE RECEIVER STRUCTURE FOR DOWNLINK TRANSMIT DIVERSITY SIGNALS

(75) Inventors: Qingyu Miao, Beijing (CN); Hai Wang, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 336 days.

(21) Appl. No.: 12/747,641

(22) PCT Filed: Dec. 14, 2007

(86) PCT No.: PCT/SE2007/051002
§ 371 (c)(1),
(2), (4) Date: Jun. 11, 2010

(87) PCT Pub. No.: WO2009/078759
PCT Pub. Date: Jun. 25, 2009

(65) Prior Publication Data
US 2010/0265994 A1 Oct. 21, 2010

(51) Int. Cl.
*H04B 1/69* (2011.01)
*H04B 1/7115* (2011.01)
*H04B 7/08* (2006.01)
(Continued)

(52) U.S. Cl.
CPC ............ *H04B 1/7115* (2013.01); *H04B 7/0848* (2013.01); *H04B 7/0894* (2013.01); *H04L 1/0631* (2013.01); *H04L 1/0668* (2013.01); *H04B 7/0669* (2013.01)
USPC ........... 375/148; 375/130; 375/142; 375/143; 375/147; 375/150; 375/152; 375/261; 375/267; 375/316; 375/340; 375/346; 375/347; 370/335; 370/342; 370/441

(58) Field of Classification Search
USPC ......... 375/144, 146–148, 260, 267, 299, 347, 375/130, 142, 143, 150, 152, 261, 316, 340, 375/341, 346; 370/208, 210, 335, 342, 369, 370/441
See application file for complete search history.

(56) References Cited

U.S. PATENT DOCUMENTS 6,754,253 B2 * 6/2004 Guey ............................ 375/148
2001/0033614 A1 10/2001 Hudson
(Continued)

FOREIGN PATENT DOCUMENTS

WO 0221729 A2 3/2002

OTHER PUBLICATIONS

Alamouti, S. M. "A Simple Transmit Diversity Technique for Wireless Communications." IEEE Journal on Select Areas in Communications, vol. 16, No. 8, Oct. 1998, pp. 1451-1458.
(Continued)

*Primary Examiner* — Daniel Washburn
*Assistant Examiner* — Eboni Hughes
(74) *Attorney, Agent, or Firm* — Coats and Bennett, PLLC

(57) ABSTRACT

Methods and apparatus are disclosed for receiving a diversity transmitted signal using a Rake or G-Rake receiver in a radio system. Signals are diversity transmitted in a first and second symbol period by two or more antennas. One or more receive antennas receive the diverse transmit signals. Weights are generated to account for the correlation between the channels over which the diverse transmit signals are transmitted in the first and second symbol period and are used to weight the received signals. The weighted signals are then fed to a mutual receiver.

12 Claims, 4 Drawing Sheets

(51) Int. Cl.
*H04L 1/06* (2006.01)
*H04B 7/06* (2006.01)

(56) References Cited

U.S. PATENT DOCUMENTS

| | | | | |
|---|---|---|---|---|
| 2005/0020237 | A1* | 1/2005 | Alexiou et al. | 455/403 |
| 2005/0069023 | A1* | 3/2005 | Bottomley et al. | 375/148 |
| 2005/0201447 | A1* | 9/2005 | Cairns et al. | 375/148 |
| 2006/0229051 | A1* | 10/2006 | Narayan et al. | 455/296 |

OTHER PUBLICATIONS

An, J. F. "Performance Analysis of Orthogonal Transmit Diversity over Intra-Cell Interference in WCDMA Downlinks." 16th IST Mobile and Wireless Communications Summit, Jul. 1-5, 2007, pp. 1-6.

Bottomley, G. E. et al. "A Generalized RAKE Receiver for Interference Suppression." IEEE Journal on Selected Areas in Communications, vol. 18, No. 8, Aug. 2000, pp. 1536-1545.

Grant, S. et al. "Generalized Rake Receivers for MIMO Systems." VTC 2003—Fall, 2003 IEEE 58th, vol. 1, pp. 424-428.

3rd Generation Partnership Project. "3rd Generation Partnership Project; Technical Specification Group Radio Access Network; Physical channels and mapping of transport channels onto physical channels (FDD) (Release 6)." 3GPP TS 25.211, V6.7.0, Dec. 2005, pp. 1-50, Sophia Antipolis Valbonne, France.

Wang, Y.-P. et al. "Transmit Diversity and Receiver Performance in a WCDMA System." IEEE Global Telecommunications Conference, 2007, Globecom '07, Nov. 26-30, 2007, pp. 4205-4209.

* cited by examiner

RAKE OR G-RAKE RECEIVER STRUCTURE FOR DOWNLINK TRANSMIT DIVERSITY SIGNALS

TECHNICAL FIELD

The present invention relates to a method and a device for receiving radio signals. In particular the present invention relates to a RAKE or GRAKE receiver and a method for receiving signals in a RAKE or a GRAKE receiver.

BACKGROUND

In WCDMA, the open loop downlink transmission diversity employs a Space Time block coding based Transmit Diversity (STTD), see 3GPP TS 25.211, "Physical channels and mapping of transport channels onto physical channels (FDD)", which is based on the Alamouti Space-Time Block Code (STBC), see S. M. Alamouti, "A simple transmit diversity technique for wireless communications", IEEE Journal on Selected Areas in Communications, Volume 16, Issue 8, October The STTD encoding is optional in UTRAN (UMTS Terrestrial Radio Access Network) UMTS is the Universal Mobile Telecommunications Systems and STTD support is mandatory in the User Equipment (UE).

Space-time block coding is a technique used in wireless communications to transmit multiple copies of a data stream across a number of antennas and to exploit the various received versions of the data to improve the reliability of data-transfer. The first STBCs were designed for a two transmitting antenna, which is a rate-1 code. It takes two time-slots to transmit two symbols, and there are two copies of each symbol transmitted.

In FIG. 1 such a diversity scheme is depicted as a baseband representation. The scheme is designed for two transmitting antennas and one receiving antenna. At a given symbol period, two signals are simultaneously transmitted from the two antennas. The signal transmitted from antenna zero is denoted by $s_0$ and from antenna one by $-s_1^*$. During the next symbol period signal $s_1$ is transmitted from antenna zero, and signal $s_0$ is transmitted from antenna one where * is the complex conjugate operation. This sequence is shown in Table 1 below.

TABLE 1

The encoding and transmission sequence for the two-branch transmit diversity scheme

|  | Antenna 0 | Antenna 1 |
|---|---|---|
| 1st symbol period | $s_0$ | $-s_1^*$ |
| 2nd symbol period | $s_1$ | $s_0^*$ |

In Table 1 the encoding is done in space and time (space-time coding). The encoding, however, may also be done in space and frequency. Instead of two adjacent symbol periods, two adjacent carriers may for example be used for the two symbol periods (space-frequency coding).

Moreover in the U.S. Pat. No. 6,754,253, a RAKE receiver structure is proposed for the transmit diversity in CDMA system where the mobile terminal includes a first rake receiver matched to a first transmitting antenna and a second rake receiver matched to a second transmitting antenna.

Also, the generalized RAKE (GRAKE) receiver, see G. E. Bottomley, T. Ottosson, and Y.-P. E. Wang, "A generalized RAKE receiver for interference suppression," IEEE J. Select. Areas Commun., vol. 18, pp. 1536-1545, August 2000 is a good means for suppressing the colored interference from the own base station in a CDMA system. The GRAKE receiver is also extended to MIMO system. see S. J. Grant, K. J. Molnar, and G. E. Bottomley "Generalized RAKE receivers for MIMO systems", VTC 2003-Fall. 2003 IEEE 58th, Volume I and Wang Hai, Miao Qingyu, "GRAKE2 modeling", EAB-06:039491, pB. Also GRAKE for STTD in WCDMA system is discussed in Y.-P. Eric Wang, G. E. Bottomley, and A. S. Khayrallah, "Transmit Diversity and Receiver Performance in a WCDMA System", submitted to globecom 2007.

In FIG. 2 a typical RAKE receiver structure 200 is depicted. In the existing structure 2 receivers are used, the first receiver detects the signal in the first symbol period and the second receiver detects the signal in the second symbol period. In the end, the signal is combined. Hence in the existing receiver structure, the receiver is configured to first obtain the channel coefficient h with channel estimation. The weighting factors w1* for the first symbol period is then obtained using the channel coefficient h, the power, the interference and noise in the first symbol period. The signal received by a first antenna 201 in the first symbol period is fed to the taps 205 of the first receiver of the RAKE/GRAKE receiver 200. The signal is despread in despreading modules 209 for each tap 205. Each despreaded signal is then multiplied with the corresponding weighting factors w1* for the first symbol period. A received signal for the first symbol period is then formed in a receiver 215. Next, the weighting factors w2* for the second symbol period are calculated with the channel coefficient h, the power, the interference and noise in the second symbol period. The detected signal in the second symbol period with the weighting factor w2* for the second symbol period is then obtained in the same manner as the signal in the first symbol period. Hence, the signal associated with the second symbol period received by a second antenna 203 is despread in despreading modules 209 for each tap 207. Each despreaded signal is then multiplied with the corresponding weighting factors w2* for the second symbol period. A received signal for the second symbol period is then formed in a receiver 217. Finally, the received signal in the first symbol period and the received signal in the second symbol period are combined to for a combined received signal in a combiner 219.

There is a constant demand to improve the efficiency in existing telecommunications systems and to utilize resources in a more cost efficient way. Hence, there exist a need for a method and a system that is able to improve over existing telecommunications systems.

SUMMARY

In one aspect, the present invention provides a receiver structure for a RAKE and GRAKE receiver that is more efficient and which requires less resources compared to existing structures.

According to one or more embodiments, in a RAKE or GRAKE receiver, a combined set of weight factors are used to combine the signal received in a first symbol period with the signal received in a second symbol period. The output from the first and second symbol period is then fed to a single, mutual receiver.

In accordance with one embodiment the method of receiving a signal is extended to multiple receiving antennas.

The invention also extends to a RAKE and GRAKE receiver structure for receiving signals in accordance with the method. In the receiver structure, only one receiver is needed for two symbol periods. In the existing receiver structures, two receivers are needed for the two symbol periods separated. Hence, one receiver can be saved. Also, with the proposed receiver structure, Multiple Input Multiple Output (MIMO) receivers can be reused for the STTD.

Another advantage provided by the method and the receiver in accordance with the present invention is that if there is correlation between the signals in the two symbol periods any such existing correlation can be utilized, which is not the case for existing RAKE and GRAKE receivers.

BRIEF DESCRIPTION OF THE DRAWINGS

The present invention will now be described in more detail by way of non-limiting examples and with reference to the accompanying drawings, in which.

DETAILED DESCRIPTION

Figure 1:
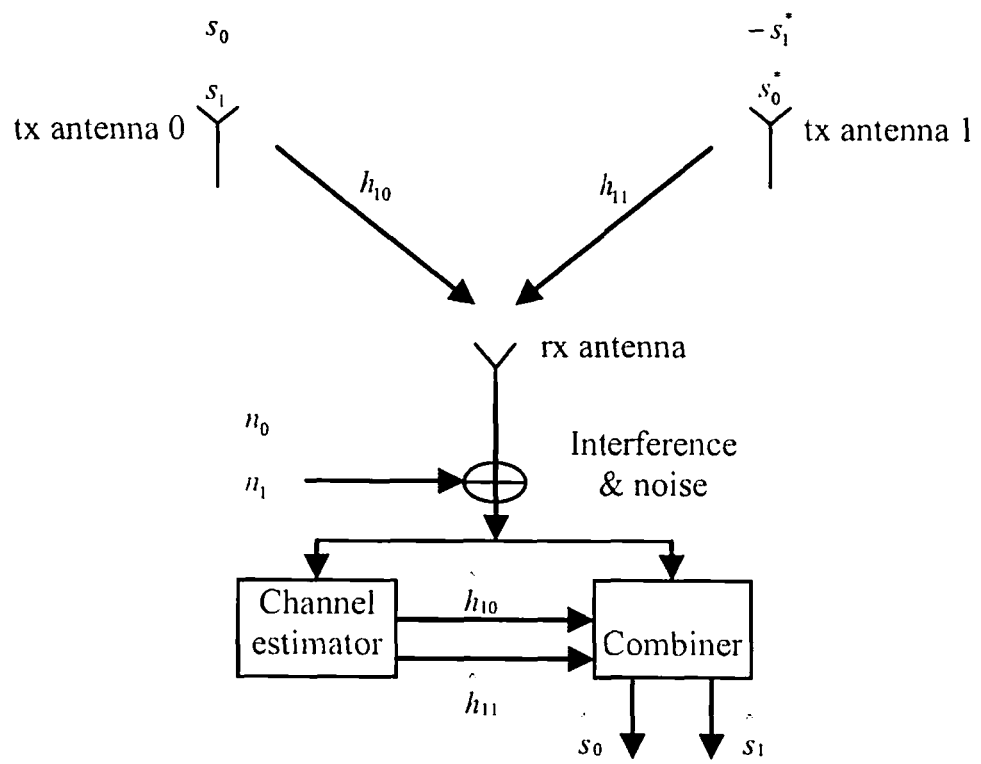
FIG. 1 is a view illustrating a STBC transmission system.
Figure 2:
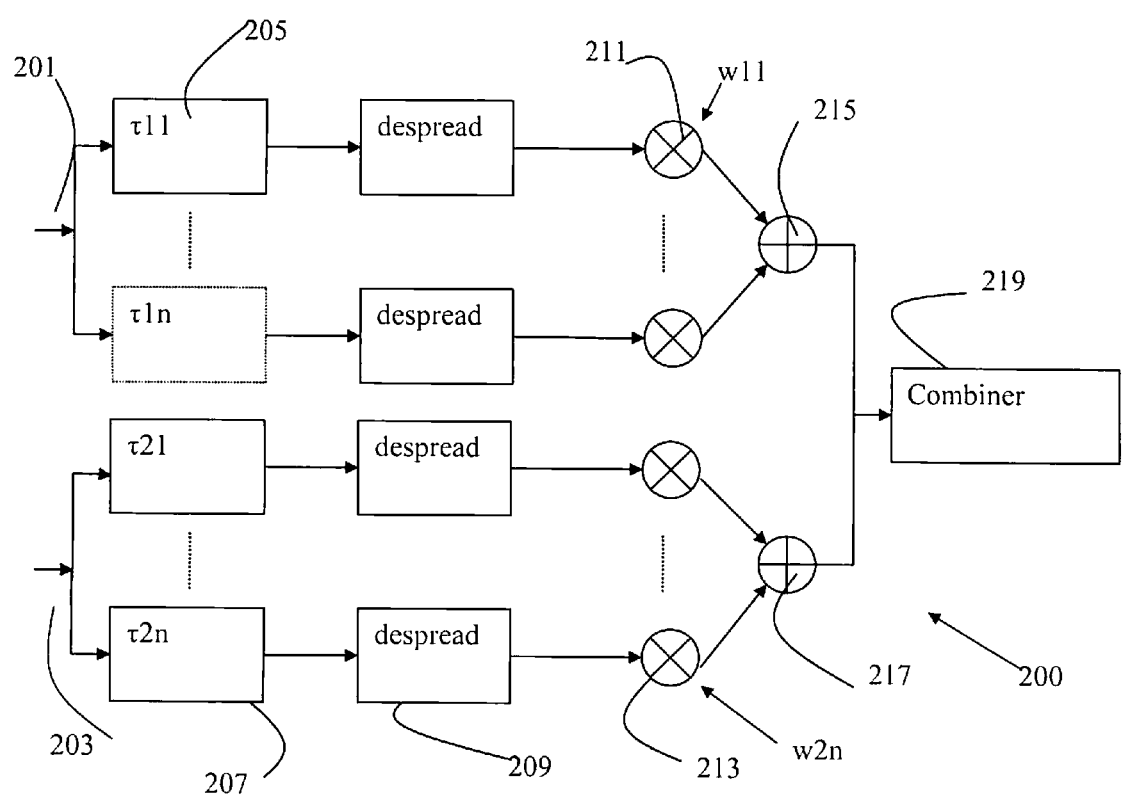
FIG. 2 is view of an existing RAKE/GRAKE receiver for receiving STBC transmitted data.

From FIG. 1 and table 1 it can be seen that the received signals at the two receiving symbol periods are, $$r_{10}(n) = \sqrt{1P_0}h_{10}(n)*s_0(n) - \sqrt{P_1}h_{11}(n)*s_1*(n) + \sqrt{N_0}z_0(n) \quad (1)$$

$$r_{11}(n) = \sqrt{P_0}h_{10}(n)*s_1(n) + \sqrt{P_1}h_{11}(n)*s_0*(n) + \sqrt{N_0}z_1(n) \quad (2)$$

Where $P_j$ is the transmission power from antenna j for the STTD user. Assume that, $$y_0(n) = r_{10}(n) = \sqrt{P_0}h_{10}(n)*s_0(n) - \sqrt{P_1}h_{11}(n)*s_1*(n) + \sqrt{N_0}z_0(n) \quad (3)$$

$$y_1(n) = r_{11}*(n) = \sqrt{P_1}h_{11}*(n)*s_0(n) + \sqrt{P_0}h_{10}*(n)*s_1*(n) + \sqrt{N_0}z_1*(n) \quad (4)$$

if $\tilde{s}_0(n) = s_0(n)$ and $\tilde{s}_1(n) = s_1*(n)$ are regarded as two streams, and the two symbol periods are regarded as two receiving antennas, then the alamouti diversity with 2 transmitting antennas and 1 receiving antenna is equivalent to a 2-by-2 MIMO system with common scrambling code (but the bandwidth is halved). The composite multi-path channels can be $$H = \begin{bmatrix} \tilde{h}_{1,1} & \tilde{h}_{1,2} \\ \tilde{h}_{2,1} & \tilde{h}_{2,2} \end{bmatrix} = \begin{bmatrix} h_{10} & -h_{11} \\ h_{11}^* & h_{10}^* \end{bmatrix} \quad (5)$$

The noise covariance is, see for example section 6. 13 in Wang Hai, Miao Qingyu, "GRAKE2 modeling", EAB-06: 039491, pB1

$$Ru_k = \frac{1}{SF}\left( \left[ R - \sum_{k'=1}^{s} P_{k'}\begin{bmatrix} \tilde{h}_{1,k'} \\ \tilde{h}_{2,k'} \end{bmatrix}\begin{bmatrix} \tilde{h}_{1,k'} \\ \tilde{h}_{2,k'} \end{bmatrix}^H \right] + SF\sum_{k'=1,k'\neq k}^{2} Pu_k\begin{bmatrix} \tilde{h}_{1,k'} \\ \tilde{h}_{2,k'} \end{bmatrix}\begin{bmatrix} \tilde{h}_{1,k'} \\ \tilde{h}_{2,k'} \end{bmatrix}^H \right) \quad k=1,2 \quad (6)$$

Assume that there are S streams in the system. Stream 1 and stream 2 are the STTD streams. $Pu_k$ is the transmission power of the desired code channel on stream k. The co-variance matrix for the received signals can be constructed as, $$R = \begin{bmatrix} R_{11} & R_{12} \\ R_{21} & R_{22} \end{bmatrix} \quad (7)$$

The detailed calculation can be found in Wang Hai, Miao Qingyu, "GRAKE2 modeling", EAB-06:039491, pB1.

This can also be extended to any number N of receiving antennas. When there are N receiving antennas with STTD, the two symbol periods are also regarded as two receiving antennas, and it is equivalent to a 2-by-2N MIMO. The composite multi-path channels for the 2 STTD streams can be $$H = \begin{bmatrix} \tilde{h}_{1,1} & \tilde{h}_{1,2} \\ \tilde{h}_{2,1} & \tilde{h}_{2,2} \\ \cdots & \cdots \\ \cdots & \cdots \\ \tilde{h}_{(2N-1),1} & \tilde{h}_{(2N-1),2} \\ \tilde{h}_{2N,1} & \tilde{h}_{2N,2} \end{bmatrix} = \begin{bmatrix} h_{10} & -h_{11} \\ h_{11}^* & h_{10}^* \\ \cdots & \cdots \\ \cdots & \cdots \\ h_{N0} & -h_{N1} \\ h_{N1}^* & h_{N0}^* \end{bmatrix} \quad (8)$$

Where, $h_{N0}$ and $h_{N1}$ are the multi-path channels between the 2 transmitting antennas and Nth receiving antenna.

And the covariance matrix can be extended to, $$R = \begin{bmatrix} R_{11} & R_{12} & \cdots & R_{1(2j-1)} & R_{1(2j)} & \cdots & R_{1(2N-1)} & R_{1(2N)} \\ R_{21} & R_{21} & \cdots & R_{2(2j-1)} & R_{2(2j)} & \cdots & R_{2(2N-1)} & R_{2(2N)} \\ \cdots & \cdots & \cdots & \cdots & \cdots & \cdots & \cdots & \cdots \\ R_{(2i-1)1} & R_{(2i-1)2} & \cdots & R_{(2i-1)(2j-1)} & R_{(2i-1)(2j)} & \cdots & R_{(2i-1)(2N-1)} & R_{(2i-1)(2N)} \\ R_{(2i)1} & R_{(2i)2} & \cdots & R_{(2i)(2j-1)} & R_{(2i)(2j)} & \cdots & R_{(2i)(2N-1)} & R_{(2i)(2N)} \\ \cdots & \cdots & \cdots & \cdots & \cdots & \cdots & \cdots & \cdots \\ R_{(2N-1)1} & R_{(2N-1)2} & \cdots & R_{(2N-1)(2j-1)} & R_{(2N-1)(2j)} & \cdots & R_{(2N-1)(2N-1)} & R_{(2N-1)(2N)} \\ R_{(2N)1} & R_{(2N)2} & \cdots & R_{(2N)(2j-1)} & R_{(2N)(2j)} & \cdots & R_{(2N)(2N-1)} & R_{(2N)(2N)} \end{bmatrix} \quad (9)$$

Where, $R_{(2i-1)(2j-1)}$ is the cross-correlation between the impairment components on fingers assigned to antenna i and antenna j in the first symbol period, $R_{(2i)(2j)}$ is the cross-correlation between the impairment components on fingers assigned to antenna i and antenna j in the second symbol period.

$R_{(2i-1)(2j)}$ is the cross-correlation between the impairment components on fingers assigned to antenna i in the first symbol period and antenna j in the second symbol period, $R_{(2i)(2j-1)}$ is the cross-correlation between the impairment components on fingers assigned to antenna i in the second symbol period and antenna j in the second symbol period.

This 2-by-2N receiver structure for STTD can be combined with RAKE or GRAKE receiver.

For RAKE receiver, the weights can be $$\begin{bmatrix} w_{1,k} \\ w_{2,k} \\ \cdots \\ \cdots \\ w_{(2N-1),k} \\ w_{2N,k} \end{bmatrix} = \begin{bmatrix} \tilde{h}_{1,k} \\ \tilde{h}_{2,k} \\ \cdots \\ \cdots \\ \tilde{h}_{(2N-1),k} \\ \tilde{h}_{2N,k} \end{bmatrix} \quad (10)$$

the GRAKE weights can be $$\begin{bmatrix} w_{1,k} \\ w_{2,k} \\ \cdots \\ \cdots \\ w_{(2N-1),k} \\ w_{2N,k} \end{bmatrix} = Ru_k^{-1} \begin{bmatrix} \tilde{h}_{1,k} \\ \tilde{h}_{2,k} \\ \cdots \\ \cdots \\ \tilde{h}_{(2N-1),k} \\ \tilde{h}_{2N,k} \end{bmatrix} \quad (11)$$

By using this receiver structure for STTD, i.e. mapping the transmit diversity to a MIMO system, only one receiver is needed for the two symbol periods, which is flexible and also saves resources.

Figure 3:
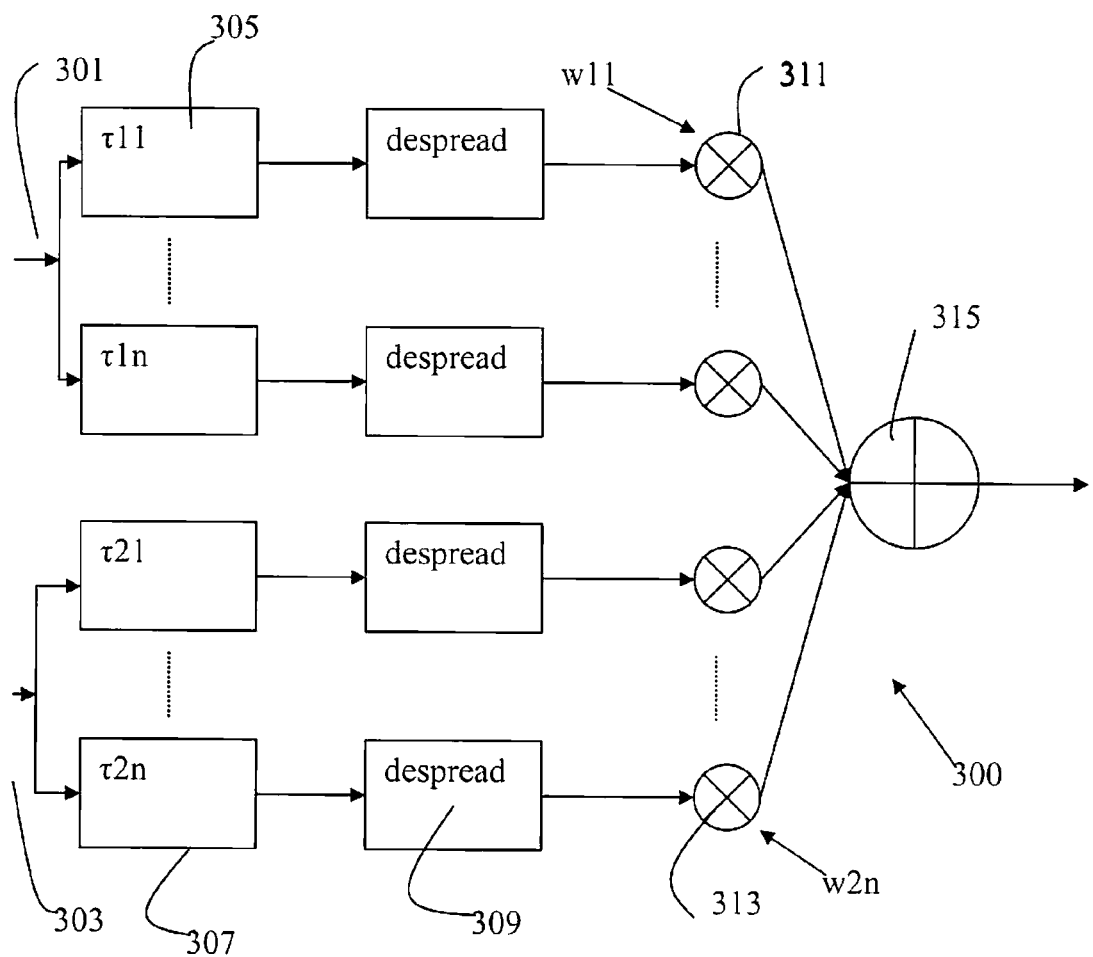
FIG. 3 is view of an exemplary RAKE/GRAKE receiver for receiving STBC transmitted data in accordance with the invention.

In FIG. 3 a RAKE/GRAKE receiver structure 300 designed to utilize weight is accordance with the present invention is depicted. Hence the receiver can comprise two receiving antennas 301 and 303 for receiving a first signal via a first antenna 301 transmitted in a first symbol period and a second antenna 303 for receiving a second signal transmitted in second symbol period. The receiver 300 further comprises a set of taps 305 and 307 associated with a receiving antenna. Each tap is associated with a particular time delay τ. The taps 305 and 307 are coupled to despreaders 309 configured to despread the signals received by the antennas 301 and 303 fed through the respective set of taps 305 and 307, respectively. Each despreaded sub-signal is then weighted with the corresponding weights calculated in accordance with the above thereby forming a weighted subsignal for each tap of the receiver structure 300 in sets of weighing units 311 and 313 respectively. The subsignals from both sets of weighing units 313 and 315 are then received by a receiver 315 as the received signal.

The receiver structure depicted in FIG. 3 can be extended to any number N of antennas. Only one receiving antenna may also be used. The receiver structure 300 may be either a RAKE receiver or a GRAKE receiver. In case the receiver structure is a RAKE receiver the weights used in the units 311 and 313 can advantageously be the weights in accordance with equation 10 above. In case the receiver structure is a GRAKE receiver the weights used in the units 311 and 313 can advantageously be the weights in accordance with equation 11 above.

Figure 4:
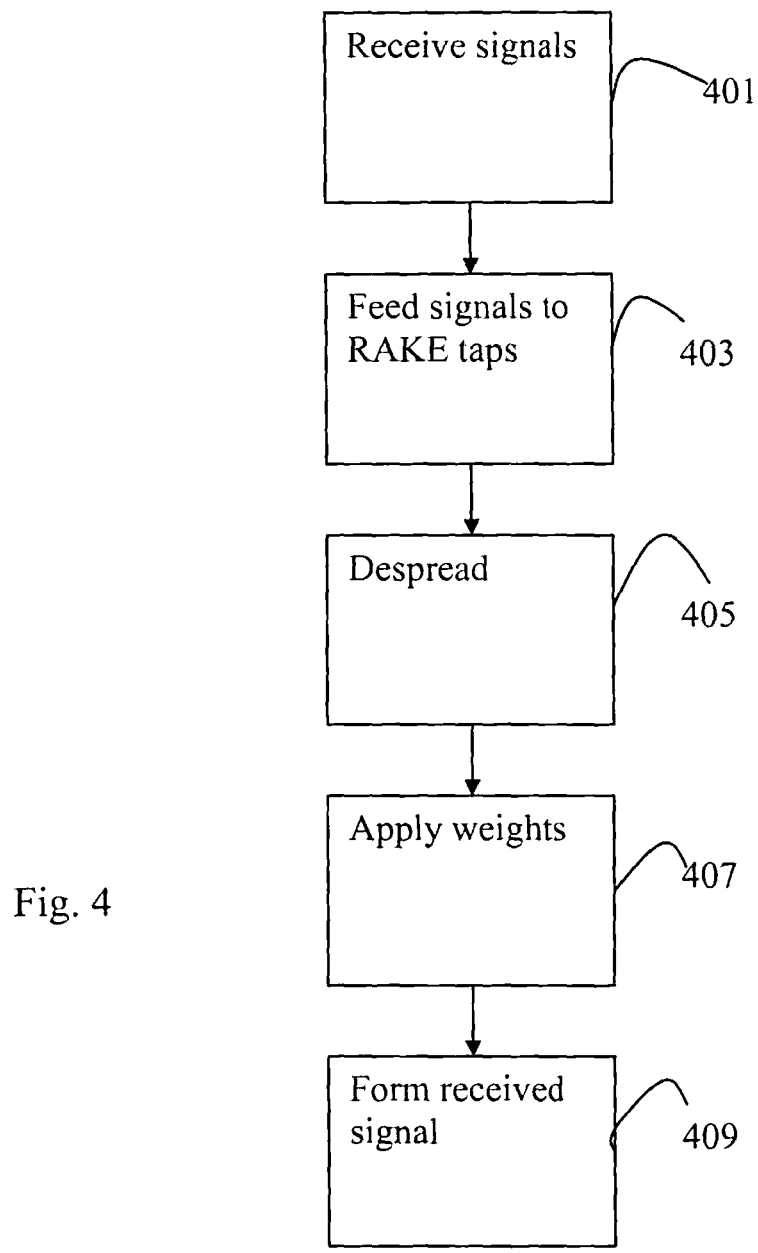
FIG. 4 is a flowchart illustrating steps performed when receiving transmitted signals.

In FIG. 4 the steps performed when receiving a signal transmitted in two symbol periods as received by the receiver structure 300 are shown. First in a step 401a first signal transmitted in a first symbol period and a second signal transmitted in second symbol period are received by two antennas. Next in a step 403 each received signal is fed trough a set of taps of the RAKE/GRAKE receiver. Each tap is associated with a particular time delay T. The output from all taps is then despread in a step 405. Thereupon each despreaded tap output is weighted with a particular weight in a step 407. Finally, all weighted signals are received by a receiver for forming the received signal in a step 409.

The method described in conjunction with FIG. 4 can be extended to any number N, one or many receiving antennas. The receiver structure used may be either a RAKE receiver or a GRAKE receiver. In case the receiver structure is a RAKE receiver the weights used can advantageously be the weights in accordance with equation 10 above. In case the receiver structure is a GRAKE receiver the weights can advantageously be the weights in accordance with equation 11 above.

By using the RAKE and GRAKE receiver structure as described herein only one receiver is needed for two symbol periods. In the existing receiver structures, two receivers are needed for the two symbol periods separated. Also, with the proposed receiver structure, Multiple Input Multiple Output (MIMO) receivers can be reused for the STTD. Another advantage obtained is that if there is correlation between the signals in the two symbol periods any such existing correlation can be utilized.

The invention claimed is:

1. A method of receiving a signal in a radio system using a RAKE or Generalized RAKE (GRAKE) receiver, the system diversity transmitting a signal in at least a first and a second symbol period where the signal transmitted in the first symbol period is received by a first antenna and the signal transmitted in the second symbol period is received by a second antenna, said method comprising:

adding respective tap delays to the signals received in the first and second symbol period;

generating weights that account for a first correlation between a first channel over which the signal is received in the first symbol period by the first antenna and a second channel over which the signal is received in the second symbol period by the second antenna and for a second correlation between the first channel over which the signal is received in the second symbol period by the first antenna and the second channel over which the signal is received in the first symbol period by the second antenna, wherein a channel coefficient of the first channel is either complex conjugate or negative complex conjugate of a channel coefficient of the second channel;

weighting the tap-delayed signal received in the first symbol period by the first antenna and the tap-delayed signal received in the second symbol period by the second antenna using the generated weights; and feeding the weighted signals from respective taps to a mutual receiver, wherein the weighted signals from different antennas received in different symbol periods are decoded together by the mutual receiver.

2. The method of claim 1, wherein the receiver is a RAKE receiver and the weights w applied to the signals of the first and second symbol periods are set to:

$$\begin{bmatrix} w_{1,k} \\ w_{2,k} \\ \cdots \\ \cdots \\ w_{(2N-1),k} \\ w_{2N,k} \end{bmatrix} = \begin{bmatrix} \tilde{h}_{1,k} \\ \tilde{h}_{2,k} \\ \cdots \\ \cdots \\ \tilde{h}_{(2N-1),k} \\ \tilde{h}_{2N,k} \end{bmatrix},$$

where the $\tilde{h}$ values denote composite channel coefficients, N denotes the number of receiving antennas, odd numbers 1, 3, ..., (2N−1) denote the first symbol period and even numbers 2, 4, ..., (2N) denote the second symbol period, and k denotes data stream k.

3. The method of claim 1, wherein the receiver is a GRAKE receiver, and wherein the weights w applied to the signals of the first and second symbol period are set to:

$$\begin{bmatrix} w_{1,k} \\ w_{2,k} \\ \cdots \\ \cdots \\ w_{(2N-1),k} \\ w_{2N,k} \end{bmatrix} = Ru_k^{-1} \begin{bmatrix} \tilde{h}_{1,k} \\ \tilde{h}_{2,k} \\ \cdots \\ \cdots \\ \tilde{h}_{(2N-1),k} \\ \tilde{h}_{2N,k} \end{bmatrix},$$

where the $\tilde{h}$ values denote composite channel coefficients and $Ru_k^{-1}$ is a noise covariance matrix, and where N denotes the number of receiving antennas, odd numbers 1, 3, ..., (2N−1) denote the first symbol period and even numbers 2, 4, ..., 2N denote the second symbol period, and k denotes a data stream k.

4. The method of claim 1, wherein at least two receiving antennas are used.

5. The method of claim 1, wherein the diversity transmission is Space Time block coding based Transmit Diversity (STTD).

6. A RAKE or Generalized RAKE (GRAKE) receiver, adapted to receive a diversity transmitted signal in at least a first symbol period by a first antenna and a second symbol period by a second antenna, wherein the receiver comprises a weighting unit configured to:
add respective tap delays to the signals received in the first and second symbol period;
generate weights that account for a first correlation between a first channel over which the signal is received in the first symbol period by the first antenna and a second channel over which the signal is received in the second symbol period by the second antenna and for a second correlation between a channel over which the signal is received in the second symbol period by the first antenna and the first channel over which the signal is received in the first symbol period by the second antenna, wherein the second channel coefficient of the first channel is either complex conjugate or negative complex conjugate of a channel coefficient of the second channel;
weight the signal received in the first symbol period by the first antenna and the signal received in the second symbol period by the second antenna with the generated weights; and
feed the weighted signals from respective taps to a mutual receiver, wherein the weighted signals from different antennas received in different symbol periods are decoded together by the mutual receiver.

7. The receiver of claim 6, wherein the receiver is a RAKE receiver and is configured to set the weights w applied to the signals of the first and second symbol period to:

$$\begin{bmatrix} w_{1,k} \\ w_{2,k} \\ \cdots \\ \cdots \\ w_{(2N-1),k} \\ w_{2N,k} \end{bmatrix} = \begin{bmatrix} \tilde{h}_{1,k} \\ \tilde{h}_{2,k} \\ \cdots \\ \cdots \\ \tilde{h}_{(2N-1),k} \\ \tilde{h}_{2N,k} \end{bmatrix},$$

where the $\tilde{h}$ values denote composite channel coefficients, N denotes the number of receiving antennas, odd numbers 1, 3, ..., (2N−1) denote the first symbol period and even numbers 2, 4, ..., (2N) denote the second symbol period, and k denotes a data stream k.

8. The receiver of claim 6, wherein the receiver is a GRAKE receiver and is configured to set the weights w applied to the signals of the first and second symbol period to:

$$\begin{bmatrix} w_{1,k} \\ w_{2,k} \\ \cdots \\ \cdots \\ w_{(2N-1),k} \\ w_{2N,k} \end{bmatrix} = Ru_k^{-1} \begin{bmatrix} \tilde{h}_{1,k} \\ \tilde{h}_{2,k} \\ \cdots \\ \cdots \\ \tilde{h}_{(2N-1),k} \\ \tilde{h}_{2N,k} \end{bmatrix},$$

where the $\tilde{h}$ values denote composite channel coefficients and $Ru_k^{-1}$ is a noise covariance matrix, odd numbers 1, 3, ..., (2N−1) denote the first symbol period and even numbers 2, 4, ..., (2N) denote the second symbol period, and where N denotes the number of receiving antennas and k denotes data stream k.

9. The receiver of claim 6, wherein the receiver includes two or more receiving antennas.

10. The receiver of claim 6, wherein the signals received in the first and second symbol periods are diversity transmitted using Space Time block coding based Transmit Diversity (STTD).

11. The method of claim 1, wherein each of the weights is generated based on the channel over which the first signal is received in the first symbol period and the channel over which the second signal is received in the second symbol period.

12. The receiver of claim 6, wherein in the weighting unit, each of the weights is generated based on the channel over which the first signal is received in the first symbol period and the channel over which the second signal is received in the second symbol period.

\* \* \* \* \*

UNITED STATES PATENT AND TRADEMARK OFFICE
CERTIFICATE OF CORRECTION

PATENT NO. : 8,934,519 B2
APPLICATION NO. : 12/747641
DATED : January 13, 2015
INVENTOR(S) : Miao et al.

Page 1 of 1

It is certified that error appears in the above-identified patent and that said Letters Patent is hereby corrected as shown below:

In the Specification

In Column 1, Line 41, delete "$s_0$" and insert -- $s_0^*$ --, therefor.

In Column 2, Line 5, delete "I" and insert -- 1 --, therefor.

In Column 2, Line 41, delete "for" and insert -- form --, therefor.

In Column 3, Line 28, in Equation (1), delete "$\sqrt{iP_0}h_{10}(n)^*$" and insert -- $\sqrt{P_0}h_{10}(n)^*$ --, therefor.

In Column 3, Line 35, in Equation (3), delete "$\sqrt{N_0}z_0(n)$" and insert -- $\sqrt{N_0}z_0^*(n)$ --, therefor.

In Column 3, Line 37, in Equation (4), delete "$*(n)*s_0(n)$" and insert -- $*s_0(n)$ --, therefor.

In Column 6, Line 3, delete "401a" and insert -- 401 a --, therefor.

In Column 6, Line 8, delete "T." and insert -- τ. --, therefor.

Signed and Sealed this
Thirtieth Day of June, 2015

Michelle K. Lee
*Director of the United States Patent and Trademark Office*